(12) United States Patent
Meggers

(10) Patent No.: US 6,968,012 B1
(45) Date of Patent: Nov. 22, 2005

(54) METHODS FOR ENCODING DIGITAL VIDEO FOR DECODING ON LOW PERFORMANCE DEVICES

(75) Inventor: Jens Meggers, Marina del Rey, CA (US)

(73) Assignee: Firepad, Inc., Costa Mesa, CA (US)

( * ) Notice: Subject to any disclaimer, the term of this patent is extended or adjusted under 35 U.S.C. 154(b) by 637 days.

(21) Appl. No.: 09/970,059

(22) Filed: Oct. 2, 2001

Related U.S. Application Data

(60) Provisional application No. 60/237,551, filed on Oct. 2, 2000.

(51) Int. Cl.[7] ............................................. H04N 7/18
(52) U.S. Cl. ........................ 375/240.24; 375/240.18; 375/240.26
(58) Field of Search ...................... 375/240.01–240.29

(56) References Cited

U.S. PATENT DOCUMENTS

| | | | | |
|---|---|---|---|---|
| 5,235,419 A | * | 8/1993 | Krause | ................... 375/240.16 |
| 6,014,694 A | * | 1/2000 | Aharoni et al. | ............. 709/219 |
| 6,169,499 B1 | * | 1/2001 | Cooper | ........................ 341/51 |

* cited by examiner

*Primary Examiner*—Andy Rao

(57) ABSTRACT

A video encoder encodes the video stream frame by frame. An encoding process generally includes receiving a video frame, subdividing the video frame into uniform pixel blocks, comparing a selected pixel block with the corresponding pixel block in a previous decoded video frame to determine which blocks have changed, copying changed pixel blocks into a contiguous memory block, and adding a preamble block, compressing the blocks. This process may be repeated for each frame using a different size pixel block to determine and select a pixel block size that results in the smallest encoded frame.

24 Claims, 5 Drawing Sheets

METHODS FOR ENCODING DIGITAL VIDEO FOR DECODING ON LOW PERFORMANCE DEVICES

RELATED APPLICATION

This non-provisional application claims a benefit of priority of the provisional patent application Ser. No. 60/237,551 titled "VIDEO ENCODING METHOD USING ADAPTIVE BLOCK SIZE DETECTION" and filed Oct. 2, 2000, the technical disclosure of which is incorporated herein by reference, in its entirety.

BACKGROUND OF THE INVENTION

1. Field of the Invention

This invention relates generally to video encoding/decoding methods and more particularly to video encoding/decoding methods for use in conjunction with low bandwidth connections and low performance devices.

2. Description of the Related Art

Video streams are regularly encoded, transmitted over computer networks, and decoded and displayed on desktop computers. Web browsers and the World Wide Web have facilitated access to and presentation of video media. The recent combination of the palmtop computing device and wireless access to the Internet has provided a basic platform for wireless web browsing. Lower bandwidths and processing performances, however, make conventional encoding and streaming techniques inapplicable for streaming video to wirelessly connected palmtop devices.

State of the art video compression standards such as H.261, H.263, MPEG1/2/4 and M-JPEG are based on either Discrete Cosine Transform (DCT) or Wavelet Transformation. Prototype implementations with H.263 and a Custom DCT codec have shown that the DCT decoding process is too slow on current Palm Operating System ("PalmOS") platforms. The same holds for the Wavelet transformations. A principal reason for this is the large number of multiplications required for decoding. Typical implementations use the Chen-Wang algorithm (IEEE ASSP-32, pp. 803–816, August 1984). In the worst case, this algorithm requires 176 multiplications and 464 adds per 8×8 pixel block. A typical PalmOS device has a 160×160 pixel frame, in which case 70,400 multiplications are needed. A 68000 series microprocessor needs roughly 80 cycles for a single multiplication. Thus, a microprocessor running at 20 MHz takes approximately 0.28 seconds to perform these multiplications, leading to a frame rate about 3 frames per second. This calculation, however, assumes the worst case. Higher frame rates may be theoretically achieved by reducing the video frame size, limiting the number of colors, and/or reducing the video quality by means of DCT vector quantisation. Shortcuts in the Chen-Wang algorithm can benefit from vectors that equal zero. Nevertheless, the given approximation of the decoding delay does not include the adds and the additional DCT vectors needed for color videos. Prototype implementations have shown that the decoding delay for a full screen video frame in photo quality is at least 1.5 seconds.

In general, a more realistic solution for very low-performance client devices is block-based difference encoding, because of its low computing demands on the decoding client device. However, it is generally accepted by those skilled in art that the central challenge in such algorithms is to select an optimal encoding block size. Quoting from New Media Republic's description of interface video encoding (see article http://www.newmediarepublic.com/dvideo/compression/adv07.html, by Collin Manning, lecturer in computer science at Cork Institute of Technology, included herein as an exhibit), 'Clearly the choice of block size must be an informed one so as to achieve the best balance between image quality and cession.'

Please note that block-based motion compensation is an entirely different category of video compression from block-based difference encoding. Motion compensation has little relevance under low-performance computing conditions, because the client-side vector algebra required for computing image region translations based on arbitrary vectors is too multiplication-intensive for low performance client devices. As a result, inventions such as Krause (U.S. Pat. No. 5,235,419) cannot be applied under these conditions, nor can they be modified to resemble block-based difference encoding methods.

For a succinct description of the differences between block-based difference coding and block-based motion compensation, refer to the aforementioned Manning article.

The embodiments of the invention seek to provide video encoding techniques and formats that are well-suited to decoding by low-performance devices, such as a PalmOS device, and that is well-suited to transmission over low-bandwidth links, such as wireless networks.

SUMMARY OF THE INVENTION

Generally, the invention provides a method and a system to encode a video stream comprising a series of frames. The video stream is encoded by a video encoder that runs on a server. The encoded video is then transmitted over a communication link to a client device whereupon a decoder decodes and displays the video stream.

The video encoder encodes the video stream frame by frame. Encoding process generally includes receiving a video frame, subdividing the video frame into uniform pixel blocks, comparing a selected pixel block with the corresponding pixel block in a previous decoded video frame to determine which blocks have changed, copying changed pixel blocks into a contiguous memory block, adding a preamble block, compressing the blocks, and repeating this process to determine and select a pixel block size that results in the smallest encoded frame.

First, the video encoder logically divides each video frame into uniform block sizes. Each of these uniform pixel blocks is compared with the corresponding pixel block from the previous decoded video frame to determine if there are any significant differences. If so, the encoder deletes the block out of the encoded video frame.

After completing the block by block comparison, the pixel blocks that have not been deleted are copied into a continuous memory block. A preamble block indicating the layout of the memory block is then added. The resulting packet comprising the preamble block and the memory block is thereafter compressed. In an embodiment, a video frame is encoded using different block sizes to choose the block size that results in smallest encoded frame.

Encoded video frame is thereafter sent over a network via a communication link to a client device. A decoder in the client device decodes and displays the decoded video frame using a corresponding decoding method.

DETAILED DESCRIPTION OF THE EMBODIMENTS

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the various embodiments. The present invention, however, may be practiced without the specific details or with certain alternative equivalent devices and methods to those described herein. In other instances, well-known methods and devices have not been described in detail so as not to unnecessarily obscure aspects of the present invention.

I. System Overview

Figure 1:
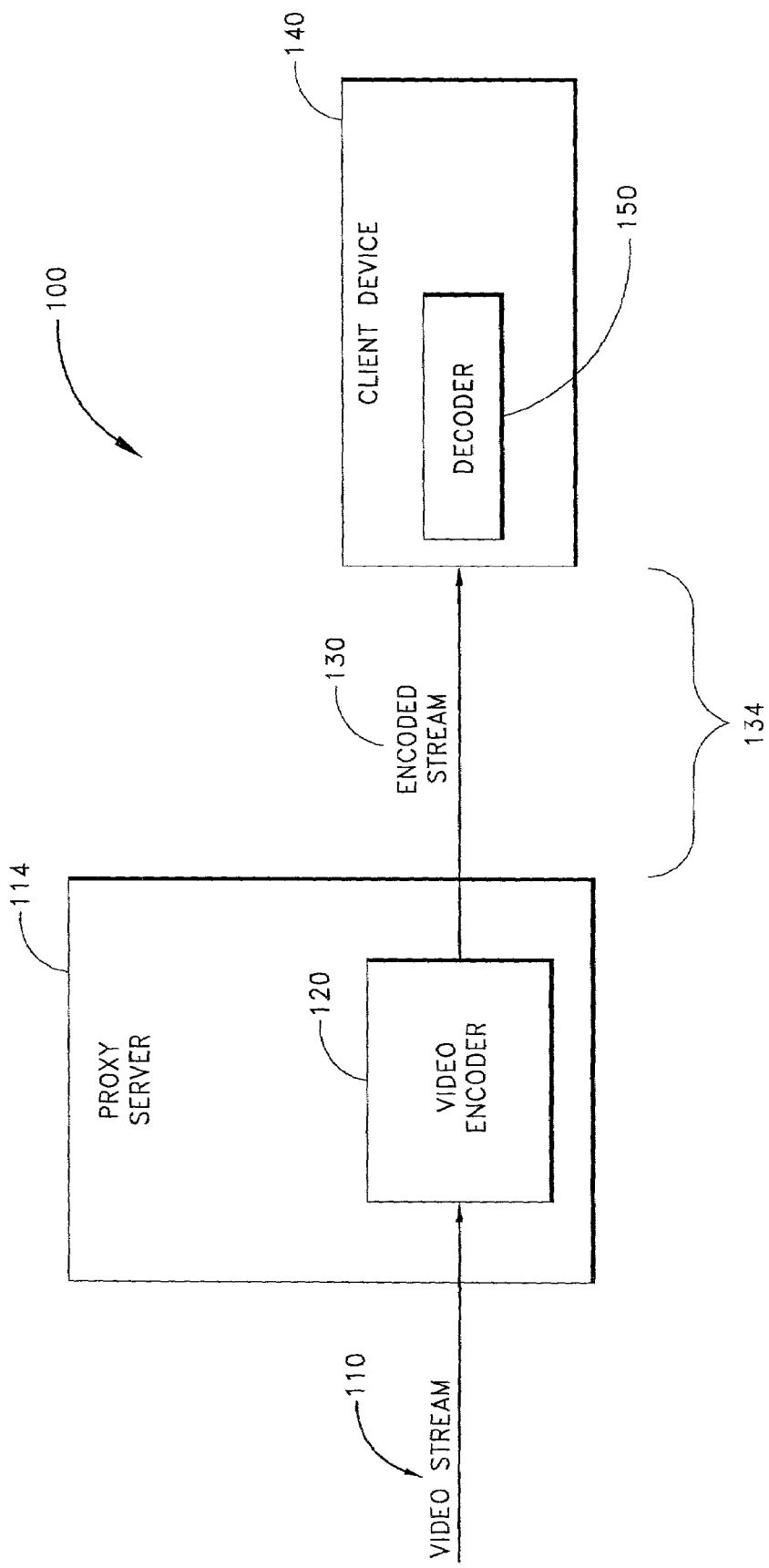
FIG. 1 illustrates a video encoding system at a general level.

FIG. 1 illustrates a system 100 in accordance with which an input video stream 110 can be encoded and streamed to a client device 140. A proxy server 114 receives the input video stream 110 from a source (another server, for example) on the Internet or any other source from which a video input stream can be obtained. The proxy server 114 can include or execute in conjunction with a video encoder 120, which encodes the input video signal into an encoded stream 130 for transmission to the client device 140. The communication link 134 between the proxy server 114 and the client device can be a wireless Internet connection via a wireless modem. Wireless modems that communicate through cellular telephone technology are presently available for many palmtop devices. The proxy server-client device communication link 134 may alternatively be a land-line modem connection or another type of connection.

The client device 140 can be a palmtop device, such as a Palm Pilot or a Handspring Visor running the PalmOS operating system. PalmOS devices generally provide a 160×160 pixel grayscale or color screen upon which video can be displayed. The client device 140 may, however, be any other device that can be configured to decode and display video, such as a desktop computer. The client device 140 includes a decoder 150, which decodes the encoded stream 130 for display on a display screen of the client device. The decoder 150 is can be a software module that executes on the client device 140, but the decoder 150 may be embodied as a hardware module that is integrated into the client device 140.

In one example configuration, video is decoded and displayed by the client device 140 as it is received. In an alternative configuration, encoded video is downloaded to a client device and stored for subsequent display.

The input stream 110 may be in any form and can be converted by the encoder 120 using conventional techniques into a format suitable for encoding in accordance with one embodiment. The input video stream 110 may, for example, be any type of previously compressed or uncompressed video stream or feed, such as, for example RGB16, RGB24. The video stream 110 can be obtained, for example, from AVI files, from various video transmitter applications, or from frame grabber software interfaces. The video encoder 120 can be configured to process all of these types of video streams as well as a variety of other video stream formats.

II. Encoding Method

Figure 2:
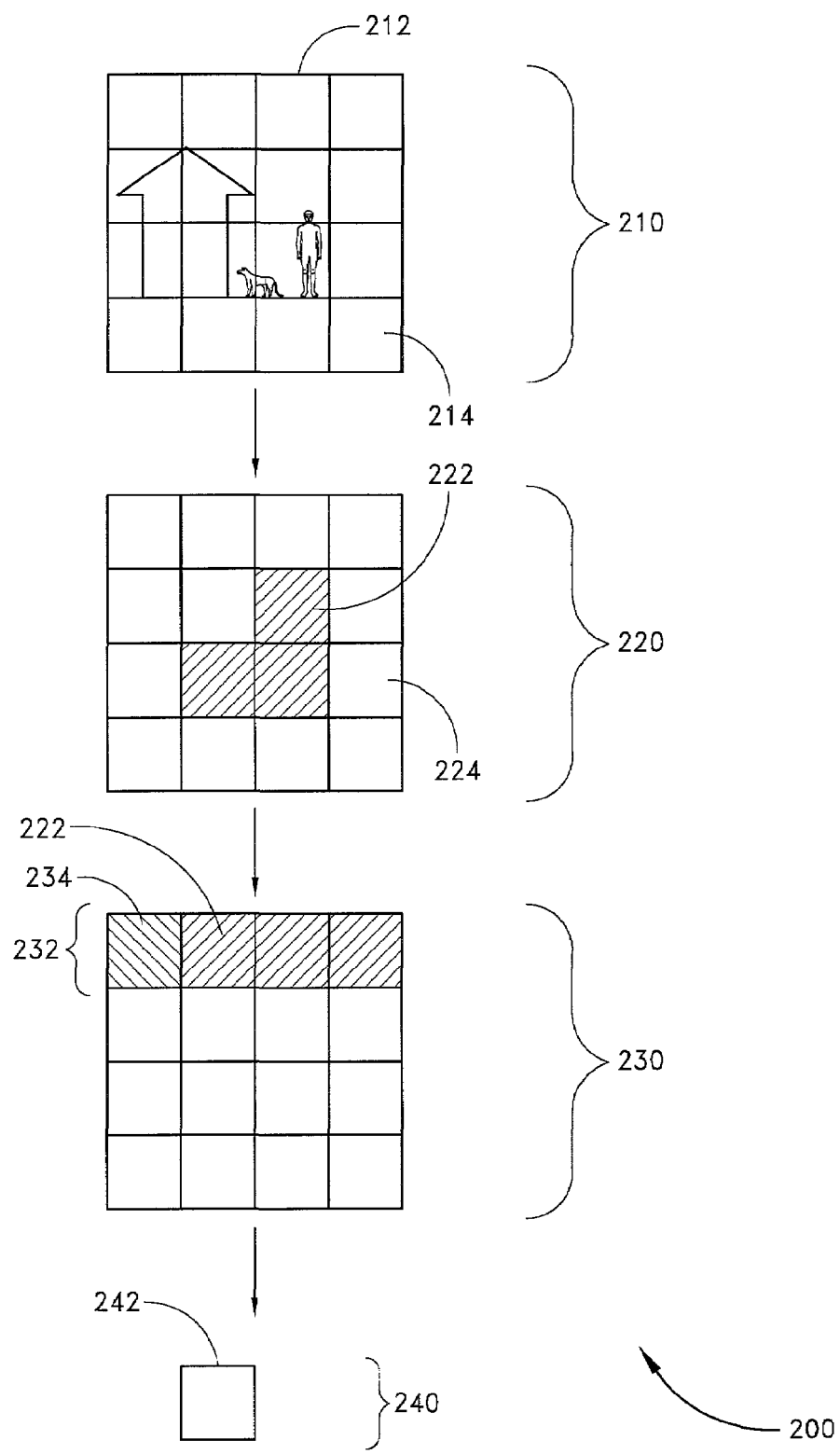
FIG. 2 illustrates a set of components for implementing the video encoding process.

FIG. 2 is a high level depiction of an encoding method 200 in accordance with one embodiment of the invention. At a first step 210, a video source frame 212 is broken into a set of blocks 214. At a block identification step 220, each block 214 is compared with the corresponding block in the previous video source frame 210 and the blocks (changed blocks 222) that have changed more than a minimum amount in relation to the previously encoded frame are identified. The blocks that have not changed more than a minimum amount (unchanged blocks 224) are not identified and may be discarded. At a crunching step 230, the identified blocks 222 are copied or moved into a contiguous block of memory 232 and a preamble block 234 is prepended to the set of blocks to identify the locations of the identified blocks 222 within the frame 210. At a crunching step 240, the contiguous block of memory containing the identified blocks 222 and the preamble 234 is compressed using a compression algorithm to create a compressed frame 242. The compressed frame 242 can then be transmitted to the client device 140 and decompressed by generally reversing the compression steps.

Figure 3:
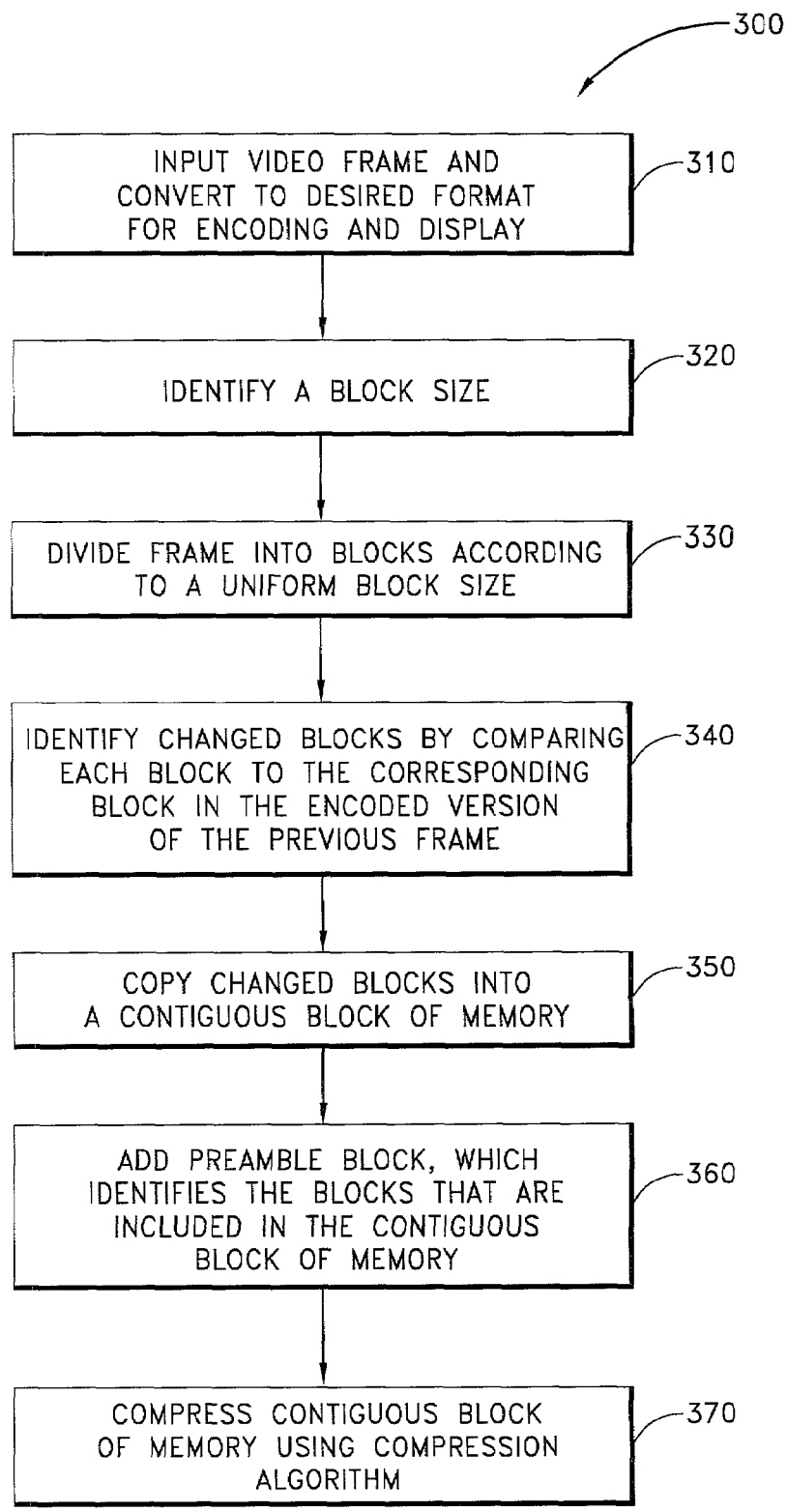
FIG. 3 illustrates a method performed by the video encoder.

FIG. 3 illustrates, in additional detail, a method 300 for encoding video in accordance with one embodiment of the invention. The method 300 can be performed by the video encoder 120 in accordance with the system 100, but the method 300 may be performed by other devices in other contexts as well.

At a step 310, a video frame is input and can be converted or transformed to a desired display resolution, size, and format. For a PalmOS device, for example, the frame may be converted to a 160×160 pixel or smaller color or grey-scale image. Color images can be transformed into YUV format, which is more effectively compressed than RGB.

At steps 320 and 330, a block size is identified and the frame is divided into a number of uniform pixel blocks 214. The size of each block may range from 1×1 (a single pixel) to the entire size of the image (e.g. 160×160). Although all of the blocks 214 for a particular frame should be the same size, different block sizes may be used in different frames. In one embodiment, the block size is identified by an encoding parameter. The block size may alternatively be identified by performing an analysis of the present frame and previously encoded frames. The determination of the block size will be discussed in additional detail below.

At a step 340, changed pixel blocks 222 are identified. Each pixel block 214 is compared to the corresponding pixel block in the decoded version of the previous encoded frame. If the pixel blocks differ by at least a minimum amount, the block is identified. In one embodiment, a difference, T, is calculated for each frame, n in relation to a previous frame n−1, based upon the value F(x,y) for a pixel located at (x,y):

$$T = \sum_{x,y<blocksize} |F_n(x, y) - F_{n-1}(x, y)|$$

The value F(x,y) for a can be the luminance component of the pixel. When T exceeds a certain threshold value, the block is identified as having changed. The selection of this threshold value may depend upon the block size, the desired image quality, and the image formats, among other things. Accordingly, a block is identified as having changed when the luminance difference is too high. The chrominance values generally may be ignored for the purpose of determining whether a pixel or block has changed. This is due to the human eye's higher sensitivity to luminance than to chrominance.

As will be understood by one skilled in the art, the step 340 must take into account the case where there is no previous decoded video frame, such as when the first frame of a sequence is encoded. In this case, all of the blocks of the frame are identified as changed.

At a step 350, the identified pixel blocks are copied or moved into a contiguous block of memory. The pixel bocks that do not have at least a minimum difference are therefore discarded. In one embodiment, the pixel blocks that are not identified are deleted from the frame and the remaining blocks moved into a contiguous memory space.

At a step 360, the video encoder 120 adds a preamble block to the contiguous block of memory to provide an identification, within the encoded frame, of the pixel blocks that have been identified. The preamble block indicates whether a particular pixel block is included in the compressed representation of the video frame. The preamble block includes a layout of the memory block to enable the decoding of the video frame by the decoder 150. The preamble block also indicates the block size that was used to encode a particular video frame. There can be one preamble block for each frame.

In one embodiment, the preamble block contains one "present" bit for each pixel block in the frame. The "present" bit specifies whether the corresponding pixel block is present or included in the encoded frame. In the case a 160×160 frame is represented using one hundred 16×16 pixel blocks, the "present" bits can be arranged, for example, in a memory block of 10 words of 16 bits each, where the last 6 bits of each word are not used. In this case, when the $5^{th}$ bit of the $3^{rd}$ word is set to 1, the $5^{th}$ block in the $3^{rd}$ row has been identified and included, meaning that the block is present in the encoded representation of the video frame. Other configurations, which may utilize some or all of the bits in a memory block, may alternatively be used.

At a step 370, the video encoder 120 compresses the contiguous block of memory to form a compressed frame 242. This compression step results in compressing both the preamble block 234 and the pixel blocks 222. The memory block can be compressed by any of a variety of compression algorithms. In one embodiment, the block is compressed by an LZW-like compression algorithm. In another embodiment, zLib compression algorithm is used. In another embodiment, LZO compression algorithm is used. Different compression algorithms can be used depending on the target client device. Certain decompression algorithms can be more effectively run on certain client devices.

The compressed video frame 242 can then be streamed or transmitted to the client device for decoding and display. In one embodiment, encoded frames are partitioned into packets that are transmitted to the decoding device in accordance with known techniques.

III. Determination of Block Size to Use in Encoding a Frame

In one embodiment, the selection of block size to encode a particular video frame is based on which block size produces the best result. The best result may be produced when the size of the encoded video frame is the smallest thereby minimizing the amount of data that need to be transferred to and decoded by the client device 140.

Figure 4:
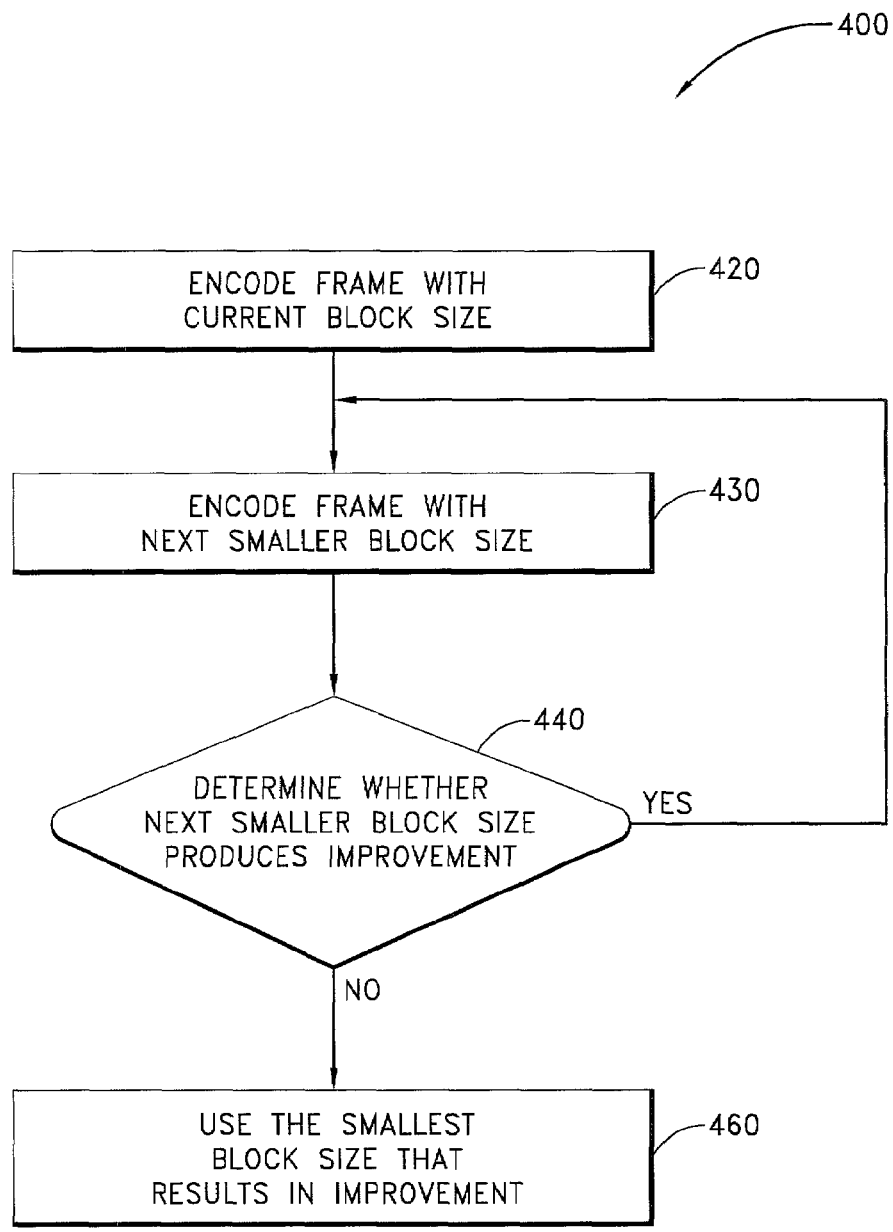
FIG. 4 illustrates a method of determining what block size to use.

FIG. 4 illustrates a method 400 of selecting a block size to produce the best result. This method can be used in conjunction with any block-based video encoding method. The size of the block used to encode a frame can substantially affect the resulting size of the encoded frame. For example, in a video sequence with a significant amount of motion, it may be advantageous to use a smaller block size because fewer changed pixels may need to be included in the encoded video frame. Therefore, the number of changed pixels that need to be included in the contiguous memory block 232 can be reduced. A larger block size may unnecessarily include additional pixels that may not have changed since the last frame.

As the block size decreases, however, the number of blocks required to represent the frame increases. Therefore, the size of the preamble block increases as the block size decreases since more bits are required to indicate whether a particular pixel block is included in the compressed representation of the video. As a result, the advantages of using a smaller block size must be weighed against the increased overhead in determining which block size produces the best result.

In one embodiment, at a step 420, a video frame is encoded in accordance with method 300 using the 16×16 block size. At a step 430, the same frame is encoded again using the next smaller block size of 8×8.

At a decision step 440, a determination as to which size produces better result is made. In one embodiment, a determination as to which block size produces the best result is made by comparing the final compressed video frame. In this embodiment, at the decision step 440, a comparison is made of the final sizes of the encoded representations of the video frame. For example, the final size of the encoded video frame using a 16×16 block size is compared with the final size of the encoded video frame using a 8×8 block size. If the encoded video frame using the 8×8 block size is smaller than the encoded video frame using the 16×16 block size, control returns to step 430 to encode the same frame again using even a smaller block size of 4×4. This process of encoding the video frame using the next smaller size blocks is continued until using the smaller size block no longer produces a smaller encoded video frame. When this occurs, the control flows to step 460. At a step 460, the smallest block size that results in improvement is used to encode the video frame.

In additional embodiments, a block size in the middle of the range of possible block sizes may be compared to the next larger and the next smaller block sizes. If the best result is produced by the middle block size then the process ends and the middle block size is used. If the best result is produced by the next larger block size, the second next larger block size is then considered and so on. If the best result is produced by the next small block size, the second next smaller block size is then considered and so on.

In accordance with one embodiment, a data table can be calculated in advance that allows the identification of the block size that results in the smallest contiguous block of memory after the preamble block is prepended to the changed blocks. The data table lists the required reduction in the number of identified blocks for each transition from a block size to a next smaller block size. One method starts with the largest block size. The method iteratively examines each smaller block size to determine if the requisite reduction in the number of identified blocks is provided. If the requisite reduction is not provided by the next smaller block size, then the larger block size will produce a smaller contiguous block of memory. Generally, a smaller contiguous block of memory will result in a smaller compressed block of memory (compressed frame 242).

IV. Decoding Method

Figure 5:
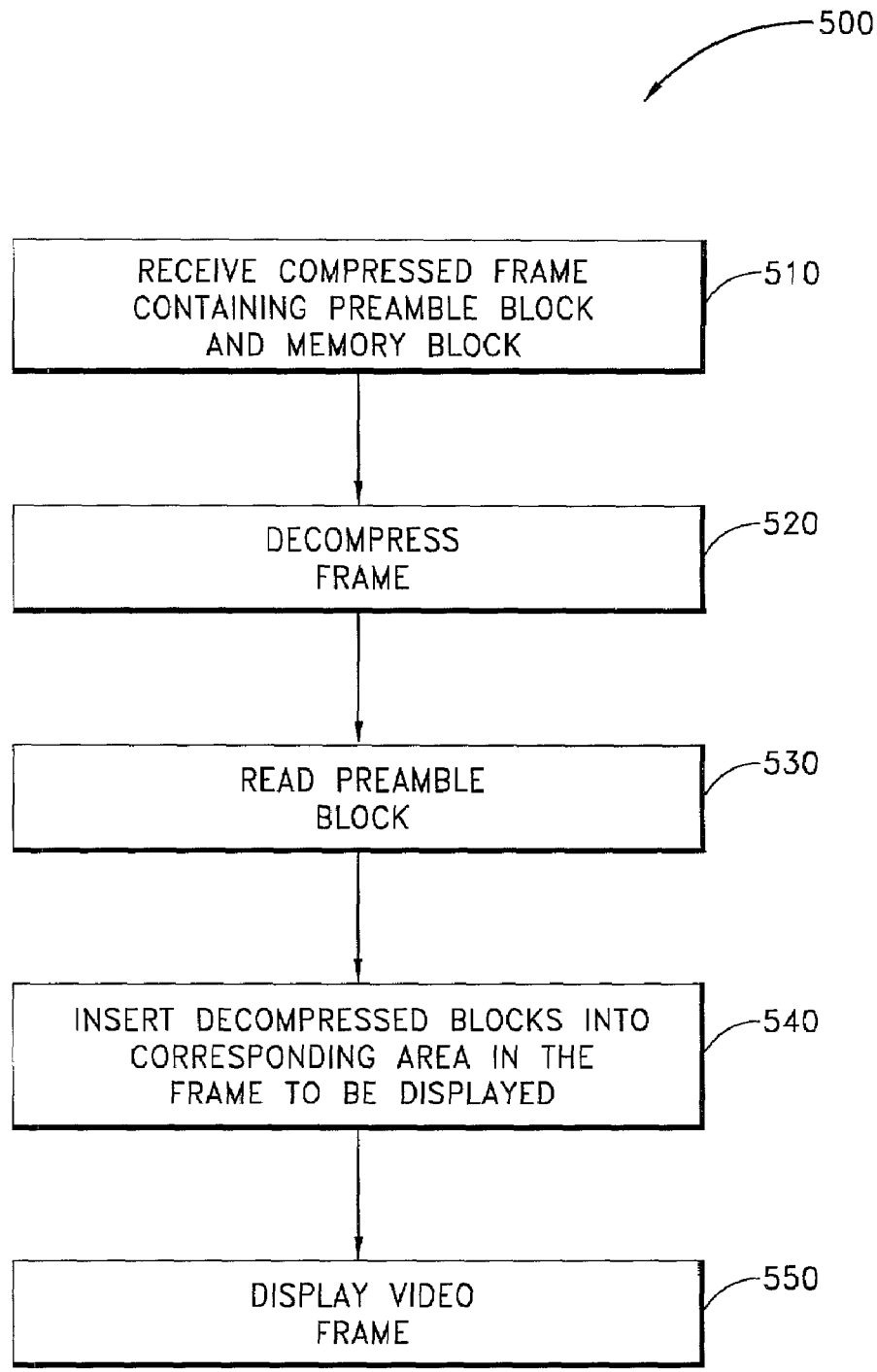
FIG. 5 illustrates a method performed by the decoder.

FIG. 5 illustrates a method 500 performed by the decoder 150 included in the client device 140. The decoder 150 maintains a working video frame that maintains the image that is displayed. The decoder 150 iterates through the method 500 to decode each encoded frame.

At a step 510, the decoder receives the compressed frame 242 containing the compressed preamble block and the memory block. At a step 520, the decoder decompresses the compressed frame 242. The step 520 reproduces the uncompressed version of the contiguous memory block containing the preamble block and the pixel blocks. The uncompressed version of the contiguous memory block can be identical to the memory block produced in the step 360 of the method 300.

At a step 530, the decoder reads the preamble block to determine what block size was used to encode the frame and to determine which pixel blocks are present in the contiguous memory block. At a step 540, the decoder reads the bit sequences in the preamble block and copies the identified pixel blocks into the corresponding video frame to be displayed. At a step 550, the decoder displays the working video frame, which is displayed by the client device 140.

In decoding a first frame in a sequence, the decoder 150 may start with an empty working frame or a working frame with old/stale data. Nevertheless, since the first frame in a sequence will contain all of the pixels in the frame, all of the pixels in the working frame will be updated.

V. Implementing Key Frames

Key frames are encoded frames about which the decoding of a sequence of frames can begin. Accordingly, a sequence can be decoded starting at a location other than its beginning. Key frames also provide the ability to seek forward and backward within a video sequence. A key frame is generally inserted at fixed time intervals in a video sequence, such as every second. Without key frames, decoding generally cannot be initiated in the middle of a sequence of encoded frames since each encoded frame may rely upon data in any number of preceding decoded frames. If decoding is initiated at a point other than the beginning of a sequence, the preceding decoded frames may not be available.

In accordance with one embodiment, a key frame contains sufficient information to allow a full frame to be produced using only the encoded key frame and a limited number of preceding encoded frames. A key frame may be configured to rely upon zero preceding frames in which case the key frame is encoded in the same way as the initial frame in a sequence by assuming all pixels have changed. A key frame may alternatively be configured to rely upon one or more preceding frames (hereinafter "associated frames"). In this case, the encoding of a key frame can be performed using the method 300, but with a modified step 340 in which the changed pixel blocks are identified. Each pixel block that is not identified as changed in at least one of the associated frames is identified as changed during the encoding of the key frame. Accordingly, each pixel block in the working frame is provided by at least one of the key frame and the associated frames. Each key frame can be identified as a key frame and the associated frames upon which the key frame depends can also identified. This identification information can also be incorporated into the preamble block.

A key frame that does not have associated frames (contains all of the pixel blocks in a video frame) can be decoded using the method 500. In order to decode a key frame that has associated frames, the associated frames are first decoded and their pixel data inserted into the working frame. The key frame is then decoded and its pixel data inserted into the working frame. Since the key frame provides all the pixels that are not provided by the associated frames, each of the pixels in the working frame is supplied with data by either the key frame or the associated frames. In an alternative embodiment, the key frame can be configured to precede rather than follow the associated frames.

VI. CONCLUSION

Although the invention has been described in terms of certain embodiments, other embodiments that will be apparent to those of ordinary skill in the art, including embodiments which do not provide all of the features and advantages set forth herein, are also within the scope of this invention. Accordingly, the scope of the invention is defined by the claims that follow. In the claims, a portion shall include greater than none and up to the whole of a thing. In method claims, reference characters are used for convenience of description only, and do not indicate a particular order for performing a method.

What is claimed is:

1. A method of encoding a video stream, comprising:
   (a) receiving a current video frame of the video stream;
   (b) subdividing the current video frame into blocks of a selected block size, and comparing the blocks to corresponding blocks of a decoded version of a preceding video frame to determine whether any of the blocks of the current video frame are sufficiently unchanged from the preceding frame to be discarded;
   (c) repeating (b) using at least one additional block size, such that the current video frame is separately subdivided and compared to the preceding video frame using multiple block sizes;
   (d) selecting from the multiple block sizes a block size that produces a best video compression result; and
   (e) encoding the video frame in the video stream with the block size selected in (d).

2. The method as in claim 1, further comprising repeating (a), (b), (c), (d), and (e) for each of multiple frames of the video stream to generate an encoded video stream in which different frames are encoded using different block sizes.

3. A method of encoding a video stream, comprising:
   receiving a current video frame of the video stream;
   determining which of multiple possible block sizes produces a best result for encoding the current video frame, wherein the block sizes are used to subdivide and compare the current video frame and a preceding video frame to determine whether any blocks of the current video frame are sufficiently unchanged to be discarded;
   compressing the current video frame using the block size determined to produce the best result, and storing the compressed video frame in conjunction with an indication of said block size.

4. A method of encoding video, the method comprising:
   dividing a video frame into blocks according to a uniform block size;
   identifying changed blocks by comparing each block to the corresponding block in a decoded version of the previous frame;
   copying changed blocks into a contiguous block of memory; and
   adding preamble block.

5. The method as in claim 4, wherein the preamble block indicates the blocks that are included in the contiguous block of memory.

6. The method as in claim 5, wherein the preamble block indicates the block size used to encode the video frame.

7. The method as in claim 4, wherein the preamble block size varies.

8. The method as in claim 4, wherein the comparison comprises determining luminance difference from the corresponding block in the encoded version of the previous frame.

9. The method as in claim 8, wherein the luminance difference threshold value is pre-defined.

10. The method as in claim 4, wherein the contiguous memory block is compressed using an LZW-like compression algorithm.

11. The method as in claim 10, wherein the compression algorithm used is zLIB.

12. The method as in claim 10, wherein the compression algorithm used is LZO.

13. A method of encoding video, the method comprising:
encoding a video frame using a first uniform block size to create a first encoded frame;
encoding the same video frame using a second uniform block size to create a second encoded frame;
comparing the size of the first encoded frame to the second encoded frame; and
selecting the uniform block size that results in a smaller encoded frame.

14. An encoded video stream comprising:
video frames wherein the video frames are encoded using multiple block sizes; and
preamble blocks including bitmaps of the encoded video frames and indicators indicating the block size used to encode the video frames in the video stream.

15. A method of decoding an encoded video stream, comprising:
receiving the encoded video frame encoded using multiple block size detection method;
decompressing the received video frame;
determining the block size used to encode the video frame;
determining which blocks are present in the encoded video frame;
copying the blocks present in the encoded video frame into the display area; and
displaying the video frame.

16. A method as in claim 15, wherein key frames can be used to decode a sequence of frames starting at a location other than its beginning.

17. A method as in claim 15, wherein the key frames can be used to seek forward and backward within the sequence of frames.

18. A data processing system comprising:
a server computer comprising a video encoder application for encoding video streams using multiple block size detection method;
a client device comprising a decoder application for decoding and displaying the encoded video streams; and
a video encoder module for encoding video streams using multiple block size detection method comprising block detection component, crunching component, and compressing component.

19. A system for encoding and decoding video, the system comprising:
identifying means for detecting pixel blocks which have changed from a previous decoded video frame;
storing means for copying the changed pixel blocks and a preamble block;
compressing means for compressing the changed pixel blocks and the preamble block; and
identifying means for selecting a smallest encoded frame.

20. A method of encoding a video stream, the method comprising:
(a) subdividing a current video frame into blocks of a selected block size;
(b) identifying blocks of the current video frame that differ by at least a minimum extent from corresponding blocks in a decoded version of a preceding video frame;
(c) repeating (a) and (b) using at least one additional block size, such that the current video frame is subdivided and compared to the preceding video frame using a plurality of block sizes; and
(d) selecting from the multiple block sizes a block size that produces a best video compression result.

21. The method as in claim 20, further comprising
(e) encoding the video frame using each of the plurality of block sizes.

22. The method as in claim 21, wherein (d) is performed based upon the results of (e).

23. The method as in claim 22, further comprising repeating (a), (b), (c), (d), and (e) for each of multiple frames of the video stream to generate an encoded video stream in which different frames are encoded using different block sizes.

24. A method of encoding a video frame, the method comprising:
providing a decoded preceding video frame;
subdividing the video frame into a plurality of blocks, wherein each block comprises at least one pixel;
identifying the blocks of the current video frame that differ by at least a minimum extent from corresponding blocks in the decoded preceding video frame;
creating a map of the locations of the identified blocks in the video frame;
arranging the map and the identified blocks in a substantially contiguous block of memory; and
applying a compression process to the data in the substantially contiguous block of memory.

* * * * *